United States Patent [19]

Elliott

[11] 3,965,065

[45] June 22, 1976

[54] METHOD OF IMPROVING THE ELECTRICAL PROPERTIES OF ORGANOPOLYSILOXANE ELASTOMERS AND COMPOSITIONS THEREFOR

[75] Inventor: Edward C. Elliott, Midland, Mich.

[73] Assignee: Dow Corning Corporation, Midland, Mich.

[22] Filed: Sept. 8, 1975

[21] Appl. No.: 611,278

[52] U.S. Cl. .............................. 260/37 SB; 252/63.5
[51] Int. Cl.² ........................................ C08L 83/04

[58] Field of Search ................ 260/37 SB; 252/63.5, 252/64

Primary Examiner—Lewis T. Jacobs
Attorney, Agent, or Firm—Roger H. Borrousch

[57] ABSTRACT

Heating a mixture of an organopolysiloxane convertible to the solid elastic state and aluminum hydrate for at least 30 minutes at a temperature above 100°C. provides a composition which can be cured to an elastomer having improved electrical properties, particularly improved electrical strength.

7 Claims, No Drawings

METHOD OF IMPROVING THE ELECTRICAL PROPERTIES OF ORGANOPOLYSILOXANE ELASTOMERS AND COMPOSITIONS THEREFOR

BACKGROUND OF THE INVENTION

1. Field of the Invention

This invention relates to organopolysiloxane elastomers with improved electrical properties and to a method for obtaining such elastomers.

2. Description of the Prior Art

Organopolysiloxane elastomers are now well known materials which find application in many technical fields. For example they are employed in the production of high temperature gaskets, as encapsulants and as electrical insulation. Some electrical applications of organopolysiloxanes require that the elastomer shall be resistant to tracking following arcing across its surface. The arc resistance of organopolysiloxane elastomers is generally satisfactory but for certain specific applications there is a demand for a significant improvement in this respect. One method which has been proposed for improving the arc resistance of such elastomers consists of incorporating into the elastomer-forming composition a proportion of aluminum hydrate. The incorporation of this compound can result in a significant improvement in arc resistance. However, it has been found that at the same time, after exposure to moisture, the elastomer suffers a marked deterioration in its resistance to breakdown under an applied voltage.

SUMMARY OF THE INVENTION

It has now been found that by suitable processing of the elastomer-forming composition the disadvantages arising from the incorporation of aluminum hydrate can be reduced or obviated. A mixture of aluminum hydrate and an organopolysiloxane convertible to the solid elastic state is heated above 100°C. for at least 30 minutes to make the elastomer-forming composition which can be cured to an elastomer with improved electrical properties.

DESCRIPTION OF THE INVENTION

This invention relates to a method for preparing an improved elastomer-forming composition which comprises forming a mixture comprising (A) an organopolysiloxane which is convertible to the solid elastic state and (B) aluminum hydrate, and heating said mixture at a temperature of at least 100°C. for a time of at least 30 minutes.

This invention also includes within its scope an elastomer-forming composition whenever obtained by said method and an elastomer which is the product of curing said elastomer-forming composition.

Organopolysiloxanes which are convertible to the solid elastic state are well known in the art and comprise polysiloxanes having primarily diorganosiloxane units but which may also contain small proportions of triorganosiloxane, mono-organosiloxane and $SiO_2$ units. The preferred convertible organopolysiloxanes are those which are substantially linear in nature and have a ratio of organic substituents to silicon atoms within the range from about 1.98:1 to 2.01:1

As organic groups of the convertible organopolysiloxane can be monovalent hydrocarbon radicals or monovalent halogenated hydrocarbon radicals. Examples of such radicals are alkyl radicals e.g. methyl, ethyl, propyl, octyl and octadecyl, alkenyl radicals e.g. vinyl and allyl, aryl, aralkyl and alkaryl radicals e.g. phenyl, phenylethyl, benzyl and tolyl and fluoroalkyl radicals e.g. 3,3,3-trifluoropropyl. Small proportions of functional radicals such as hydroxyl, acyloxy and oximo may also be present, especially in terminal siloxane units. Such functional radicals will normally be present when the elastomer-forming composition is of the so-called room temperature vulcanizing type. Preferably at least 50 percent of the total radicals are methyl radicals with any remaining radicals being selected from phenyl, vinyl and 3,3,3-trifluoropropyl. When alkenyl radicals are present in the convertible organopolysiloxane such radicals preferably comprise less than about 0.5% of the total organic groups.

The convertible organopolysiloxanes may be homopolymers or copolymers and may vary in consistency from viscous liquids to stiff, high molecular weight gums. Examples of convertible organopolysiloxanes which may be employed in the process of this invention therefore include polydimethylsiloxanes, polymethyl(3,3,3-trifluoropropyl)siloxanes, copolymers of dimethylsiloxane units and methylvinylsiloxane units and copolymers of dimethylsiloxane units and diphenylsiloxane units. As stated hereinabove the copolymers may be terminated with functional radicals e.g. hydroxyl. They may however be terminated with any desired siloxane unit, for example trimethylsiloxane units, dimethylvinylsiloxane units and methylphenylvinylsiloxane units. Except to the extent it may form part of the curing mechanism the particular type of terminal unit is not critical.

The aluminum hydrate component may be present in any amount which is effective in providing the desired improvement in arc resistance. Generally the aluminum hydrate is employed in proportions of from about 15 to 200 parts by weight per 100 parts by weight of the organopolysiloxane (A). Less than 15 parts of (B) is not usually sufficient to provide a worthwhile increase in arc resistance while more than 200 parts can result in an elastomer having inferior physical properties.

In addition to components (A) and (B) the elastomer-forming compositions of this invention may also contain one or more fillers and other additives, for example heat stability additives, anti-structure agents and pigments. Preferably at least some of the filler content comprises a reinforcing filler, for example fume silica or precipitated silica. Other fillers which may be employed include diatomaceous earths, ground quartz, zinc oxide, calcium carbonate, titania and magnesium oxide. The proportion of such additional fillers will depend on the physical properties and other characteristics desired in the elastomer. Generally such additional fillers will be present in a proportion of from 10 to 150 parts by weight per 100 parts of convertible organopolysiloxane (A).

Any convenient procedure may be employed for preparing elastomer-forming compositions according to the method of this invention. Thus (A) and (B) may be mixed, together with any additional fillers or other ingredients, and heat applied to the mixture during and/or subsequent to the mixing step. Alternatively (B) may be added in the desired proportion to a preformed mixture of (A) and other ingredients and the mixture then subjected to the required heating step. It will of course be understood that to avoid premature curing, heat sensitive curing agents e.g. organic peroxides are best incorporated into the composition after the heating step has been carried out.

The elastomer-forming composition should be heated to a temperature of at least 100°C. for at least 30 minutes. Preferably however the heating step is carried out at a temperature of from about 140° to 180°C. for a period of from 1 to 3 hours. Higher temperatures and/or extended heating times can be used provided they are not taken to the point at which thermal degradation of the composition occurs. Advantageously the composition is subjected to reduced pressure during the heating step.

The elastomer forming compositions of this invention may be converted to the elastomeric state by any suitable curing technique, for example by exposure to high energy radiation or by the use of a heat activated curing agent. Examples of the latter include benzoyl peroxide, dicumyl peroxide, tertiary butyl peracetate, tertiary butyl perbenzoate, monochlorobenzoyl peroxide, 2,4-dichlorobenzoyl peroxide and tertiary butyl cumyl peroxide. Also applicable is the so-called cold curing mechanism wherein the convertible organopolysiloxane contains functional radicals, e.g. hydroxyl, oximo or acyloxy and curing takes place at normal or slightly elevated temperatures with or without the addition of a crosslinking agent and a curing catalyst. Yet another method which is applicable when the convertible organopolysiloxane contains alkenyl e.g. vinyl radicals involves crosslinking the organopolysiloxane with a siloxane containing SiH groups in the presence of a suitable catalyst e.g. a platinum compound or complex.

The elastomer-forming compositions of this invention are particularly useful for the fabrication of electrical insulation having improved resistance to electric arcing and tracking while maintaining its electrical strength.

The following examples are presented for illustrative purposes only and should not be construed as limiting the invention which is properly delineated in the claims. All parts are parts by weight unless otherwise stated.

EXAMPLE 1

To 100 parts of a composition consisting of 100 parts of a copolymer gum of 99.858 mole percent dimethylsiloxane units and 0.142 mole percent of methylvinylsiloxane units and 25 parts of a reinforcing silica filler (surface area 300 m²/g), 100 parts of aluminum hydrate was added with mixing. The mixture was then placed in a closed vessel under a vacuum of 20 inches Hg and heated for 2 hours at about 160°C. On cooling 0.4 parts of dicumyl peroxide was mixed into 100 parts of the composition and the resulting mixture cured by molding into a flat sheet (0.50 in. thick) under pressure for 10 minutes at 160°C.

For purposes of comparison the above procedure was employed to make a second elastomeric sheet except that heating of the mixture following addition of the aluminum hydrate was omitted.

Samples of the elastomers were then subjected to an arc resistance test according to ASTM D495-71. Samples of the elastomers were also immersed in water at 20°C. for 70 hours, removed and wiped dry and then subjected to dielectric strength measurement employing 3 inch diameter electrodes and rate of voltage increase of 1Kv per second.

The results obtained are set out in Table I.

TABLE I

| Sample | Arc Duration (sec) | Breakdown Voltage (Kv) | Electric Strength (volts/mil) |
|---|---|---|---|
| With heating step | 325 | 28.5 | 475 |
| Without heating step | 190 | 2.8 | 60 |

EXAMPLE 2

A mixture of 100 parts of a dimethylvinylsiloxy endblocked polydimethylsiloxane gum having a Williams plasticity of from 0.055 and 0.065 inch and 30 parts of aluminum hydrate was heated at 180°C. for 1.5 hours under reduced pressure. The mixture was cooled and 1.3 parts of an equal weight mixture of carbon black and polydimethylsiloxane gum, 4.6 parts of fume titanium dioxide, 0.13 part of a 6 weight percent solution of chloroplatinic acid hexahydrate in isopropanol and 0.85 part of 2,4-dichlorobenzoyl peroxide was mixed into the cooled mixture. The resulting mixture was press cured for 10 minutes at 116°C. The above procedure was repeated except the heating step of 1.5 hours at 180°C. was eliminated. The electric strength was determined on each elastomer as described in Example 1. The results were as shown in Table II.

TABLE II

| Sample | Electric Strength (volts/mil) |
|---|---|
| With heating step | 378 |
| Without heating step | 327 |

EXAMPLE 3

A mixture of 100 parts of polydiorganosiloxane gum having 0.3 mol percent methylvinylsiloxane units and 99.7 mol percent dimethylsiloxane units, 8 parts of a hydroxyl endblocked polydimethylsiloxane fluid having about 4 weight percent silicon-bonded hydroxyl radical, 2 parts of a fluid hydroxyl endblocked copolymer of dimethylsiloxane units and methylvinylsiloxane units, 10 parts of fume silica and 150 parts of aluminum hydrate was heated at 180°C. for 1.5 hours under reduced pressure. The mixture was cooled and 2.7 parts of an equal weight mixture of carbon black and polydimethylsiloxane gum, 5.4 parts of fume titanium dioxide, 0.27 part of a 6 weight percent solution of chloroplatinic acid hexahydrate in isopropanol and 1.76 parts of 2,4-dichlorobenzoyl peroxide was mixed into the cooled mixture. The resulting mixture was press cured for 10 minutes at 116°C. The above procedure was repeated except the heating step of 1.5 hours at 180°C. was eliminated. The electric strength was determined on each elastomer as described in Example 1. The results were as shown in Table III.

TABLE III

| Sample | Electric Strength (volts/mil) |
|---|---|
| With heating step | 346 |
| Without heating step | 270 |

That which is claimed is:

1. A method for preparing an improved elastomer-forming composition which comprises forming a mixture comprising (A) an organopolysiloxane which is convertible to the solid elastic state and (B) aluminum hydrate, and heating said mixture at a temperature of at least 100°C. for a time of at least 30 minutes.

2. The method in accordance with claim 1 in which the aluminum hydrate is present in an amount of from 15 to 200 parts by weight per 100 parts by weight of the polyorganosiloxane.

3. The method in accordance with claim 2 in which the elastomer-forming composition is heated at a temperature of from 140°C. to 200°C. for a time of from 1 to 3 hours.

4. An elastomer-forming composition prepared by the method of claim 1.

5. The method in accordance with claim 1 in which the prepared elastomer-forming composition is cooled below 100°C. and an organic peroxide vulcanization catalyst is added and mixed into the composition.

6. A mixture obtained by the method of claim 5.

7. An elastomer obtained by heating the mixture of claim 6 above the activation temperature of the organic peroxide.

* * * * *